(12) United States Patent
Wang

(10) Patent No.: US 12,042,096 B2
(45) Date of Patent: Jul. 23, 2024

(54) FOLDABLE STIRRING CUTTER

(71) Applicant: Weijinghui E-Commerce (Shenzhen) Co., Ltd., Shenzhen (CN)

(72) Inventor: Liang Wang, Shenzhen (CN)

( * ) Notice: Subject to any disclaimer, the term of this patent is extended or adjusted under 35 U.S.C. 154(b) by 0 days.

(21) Appl. No.: 18/415,830

(22) Filed: Jan. 18, 2024

(65) Prior Publication Data
US 2024/0148188 A1 May 9, 2024

(30) Foreign Application Priority Data

Nov. 23, 2023 (CN) .......................... 202311574652.1

(51) Int. Cl.
| | | |
|---|---|---|
| A47J 43/07 | (2006.01) | |
| B01F 27/1123 | (2022.01) | |
| B01F 27/1125 | (2022.01) | |
| B02C 18/20 | (2006.01) | |

(52) U.S. Cl.
CPC ....... A47J 43/0722 (2013.01); B01F 27/1123 (2022.01); B01F 27/11253 (2022.01); B02C 18/20 (2013.01)

(58) Field of Classification Search
CPC ........... B26B 11/001; Y01T 403/32549; Y01T 403/32557
See application file for complete search history.

(56) References Cited

U.S. PATENT DOCUMENTS

| | | | | |
|---|---|---|---|---|
| 1,902,506 A | * | 3/1933 | Johnston | A47J 17/18 99/633 |
| 3,156,278 A | * | 11/1964 | Otto | B02C 18/08 D7/413 |
| 3,692,427 A | * | 9/1972 | Risse | B01F 27/0541 415/141 |
| 4,126,023 A | * | 11/1978 | Smith | F16K 35/06 70/180 |
| 4,770,388 A | * | 9/1988 | Carman | F16K 5/0647 251/95 |

(Continued)

FOREIGN PATENT DOCUMENTS

| | | | | |
|---|---|---|---|---|
| CN | 209121987 U | * | 7/2019 | .............. A47J 43/07 |
| CN | 112006565 A | * | 12/2020 | ............ A47J 43/046 |

(Continued)

*Primary Examiner* — Debra M Sullivan
*Assistant Examiner* — Matthew Stephens
(74) *Attorney, Agent, or Firm* — Daniel M. Cohn; Howard M. Cohn

(57) ABSTRACT

A foldable stirring cutter includes a cutter assembly rotationally disposed on a base; a bearing component detachably disposed on the cutter assembly and including a central bearing plate and equally spaced extension plates having an internally threaded connection hole; cutter components including a cutter handle, a cutter body, and a blade portion; and movable connection assemblies including a through hole through the cutter handle, an arc-shaped limiting groove in the through hole, an internally threaded limiting rod having a threaded portion on a lower portion of an outer surface and being threadedly fastened in the connection hole, and a limiting block on an upper portion of the outer surface of the limiting rod and being moveable in the limiting groove, and a limiting bolt being driven through the through hole to secure to the limiting rod. The cutter assembly folds in response to hitting a stirred material.

1 Claim, 10 Drawing Sheets

(56) References Cited

U.S. PATENT DOCUMENTS

| | | | | |
|---|---|---|---|---|
| 9,320,391 | B2* | 4/2016 | Zakowski | A47J 43/046 83/167 |
| 9,327,256 | B2* | 5/2016 | Markle | B01F 33/86 83/167 |
| 2002/0029426 | A1* | 3/2002 | Seber | B26B 1/048 7/128 |
| 2008/0163768 | A1* | 7/2008 | Glucksman | A47J 43/085 83/167 |
| 2010/0050827 | A1* | 3/2010 | Lin | B25F 1/04 81/489 |

FOREIGN PATENT DOCUMENTS

| | | | | |
|---|---|---|---|---|
| CN | 212632897 U | * | 3/2021 | B02C 18/10 |
| FR | 2603221 A1 | * | 3/1988 | B26D 1/28 |

* cited by examiner

FOLDABLE STIRRING CUTTER

TECHNICAL FIELD

The present disclosure relates to the technical field of stirring cutters, and in particular to a foldable stirring cutter.

BACKGROUND

A blender and juicer are food processing machines that can easily and quickly process and crush ingredients, especially to make juice, pulp, dry powder, dried fruits, crushed ice, and mincemeat according to personal preference. Therefore, freshness and nutrition of foods are ensured.

At present, a known multi-blade stirring cutter is manufactured by riveting a fixed blade and a blade fixing post. When stirring starts or during a stirring process, the fixed blade collides with a stirred material, but cannot countervail a lever force. When an impact point of the stirred material and the blade is located at a front end of the fixed blade, because the impact point is relatively far away from a support point of the fixed blade, a torque is longer. Therefore, a large lever force is generated. As a result, there are larger loads on the front end and the support point of the fixed blade, the blade is easy to be damaged. In addition, when the stirred material is relatively large, the fixed blade is easy to be jammed by the stirred material, and cannot operate normally. In daily life, stirred materials are in different sizes and shapes. Generally, a stirring cutter on the market is easy to be jammed by a large heterogeneous stirred material in a stirring process, causing difficulties for users, and user experience is poor. In view of this, the present invention provides a foldable stirring cutter.

SUMMARY

To overcome the disadvantages in the prior art and meet the demand of the reality, the present disclosure provides a foldable stirring cutter, to resolve technical problems that a fixed blade structure of a current stirring cutter is easy to be damaged in use by a lever force generated after collision with a stirred material, and is easy to be jammed by a large heterogeneous stirred material.

To achieve the above objective, the present disclosure adopts the following technical solutions. A foldable stirring cutter includes a base having a cutter assembly rotationally disposed at a top.

The cutter assembly includes a bearing component that is detachably disposed on an outer edge surface and a shaft.

The bearing component includes a bearing plate and at least two extension plates that are fastened to an outer edge surface of the bearing plate in a ring-shaped equidistant array. Two sets of force-controlled cutter components that are movably connected to the extension plates are disposed on the bearing component. Connection holes are provided inside the extension plates, movable connection assemblies that are used to movably connect the force-controlled cutter components to the extension plates are disposed inside the connection holes. The force-controlled cutter components deflect and unfold around axes of the movable connection assemblies under action of a centrifugal force, or the force-controlled cutter components deflect and fold around the axes of the movable connection assemblies under action of a lever force borne after collision with a stirred material.

Preferably, the force-controlled cutter component includes a cutter handle and a cutter body that are separately disposed and movably connected, the cutter handle is movably connected to the extension plate through the movable connection assembly, the cutter body is movably connected to the cutter handle through the movable connection assembly, and a blade portion II is formed at an outer edge surface of the cutter body.

Preferably, the force-controlled cutter component includes a cutter handle and a cutter body that are integrated together, and a blade portion II formed on the outer edge surface of the cutter body, and the cutter handle is movably connected to the extension plate through the movable connection assembly.

Preferably, the movable connection assembly includes a through hole I provided in the cutter handle, and a rivet that is used to rotationally limit and fasten the force-controlled cutter component and the bearing component is disposed in the through hole I.

Preferably, the connection hole is an internally threaded through hole provided on the extension plate, the movable connection assembly includes a through hole II provided in the cutter handle, and an arc-shaped limiting groove that extends inside towards the cutter handle is provided in an inner wall of the through hole II.

Preferably, the movable connection assembly further includes a limiting rod that has a threaded portion and that is located on an outer edge surface at a bottom. A limiting block is disposed at a top of the outer edge surface of the limiting rod, and a threaded hole is centrally provided at a top of the limiting rod. A bottom of the limiting rod is connected inside the connection hole in a threaded manner, and the top of the limiting rod extends inside the through hole II. The limiting block is adaptively mounted in the arc-shaped limiting groove, and a limiting bolt of which one end is screwed in the threaded hole is disposed in the through hole II.

Preferably, ice crushing teeth are disposed at a corner of the extension plate, the ice crushing teeth are linearly distributed and disposed at an angular position of the extension plate, and a shaft penetrating hole through which the shaft passes is centrally provided inside the bearing plate.

Preferably, V-shaped short-shaft cutters are disposed on an upper surface and a lower surface of the bearing plate, the V-shaped short-shaft cutters are distributed in a cross, and a blade portion I is disposed on a lateral side of the V-shaped short-shaft cutters. A limiting base is disposed on the outer edge surface of the shaft, and the V-shaped short-shaft cutters are overlapped on the limiting base. A top of the shaft extends outside the V-shaped short-shaft cutter and the bearing component and has a threaded post. A locking bolt that is connected to the threaded post in a threaded manner and used to press and fasten the V-shaped short-shaft cutter and the bearing component to the limiting base is disposed outside the top of the shaft.

Compared with the prior art, the present disclosure has the following beneficial effects.

1. The bearing component, the force-controlled cutter component, and the movable connection assemblies are disposed, so that the cutter assembly generates a centrifugal force during rotation. The force-controlled cutter component is thrown out under action of the centrifugal force, to increase a stirring area after the force-controlled cutter component is unfolded, and fully stir the stirred material. When the stirred material is relatively large, the force-controlled cutter component is collided during rotation. If the lever force generated after collision is greater than the centrifugal force generated after rotation of the cutter assembly, the stirred material pushes the force-controlled cutter component to be contracted and folded along the axis of the movable connection assembly. If the lever force generated after collision is less than the centrifugal force generated after rotation of the cutter assembly, the force-controlled cutter component continues to stir in an unfold state under action of the centrifugal force. In addition, when a large heterogeneous stirred material is stirred, due to a folded state of the force-controlled cutter component can prevent the force-controlled cutter component from being jammed. Therefore, an operating state of the cutter can be adaptively switched based on the stirred material and a specific stirring environment. This is conducive to reducing damage to the cutter and prevent the stirred material from being jammed.

Figure 1:
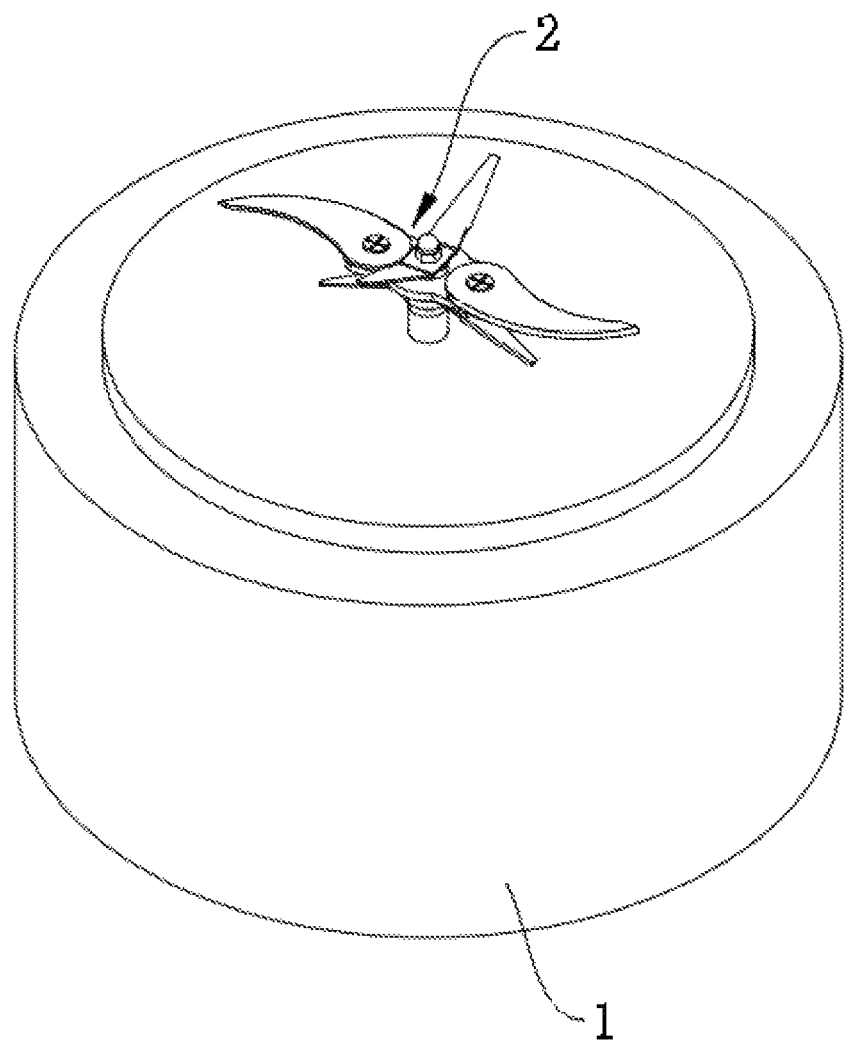
FIG. 1 is a schematic diagram of a structure of the present disclosure.
Figure 2:
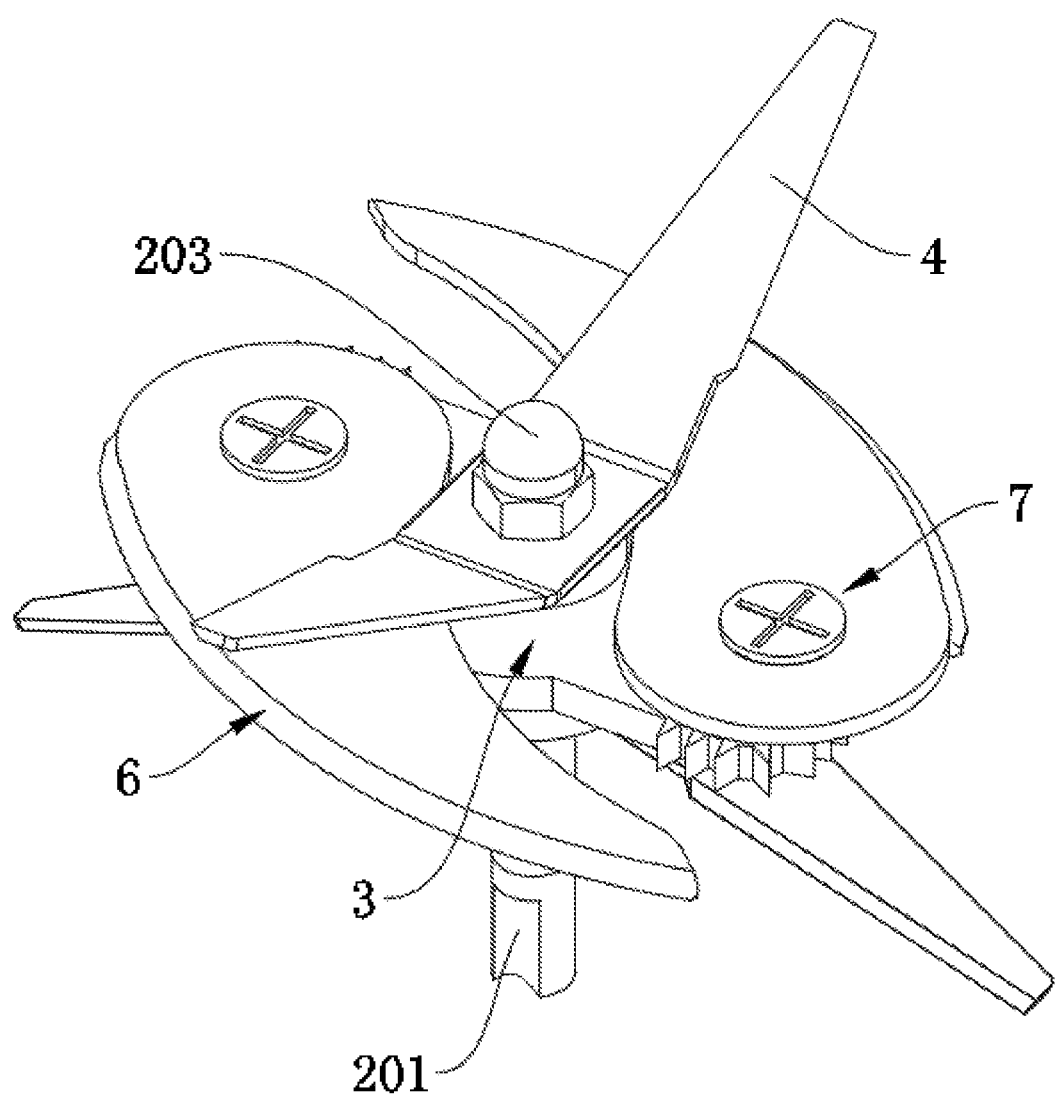
FIG. 2 is a schematic diagram of a structure of a cutter assembly in a folded state according to the present disclosure.
Figure 3:
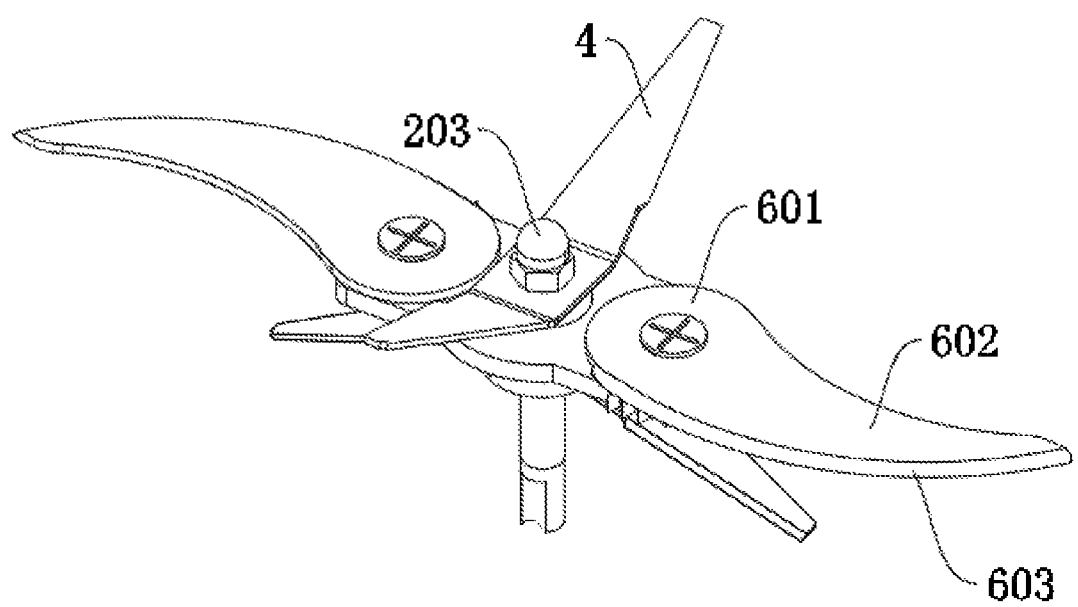
FIG. 3 is a schematic diagram of a structure of a cutter assembly in an unfolded state according to the present disclosure.
Figure 4:
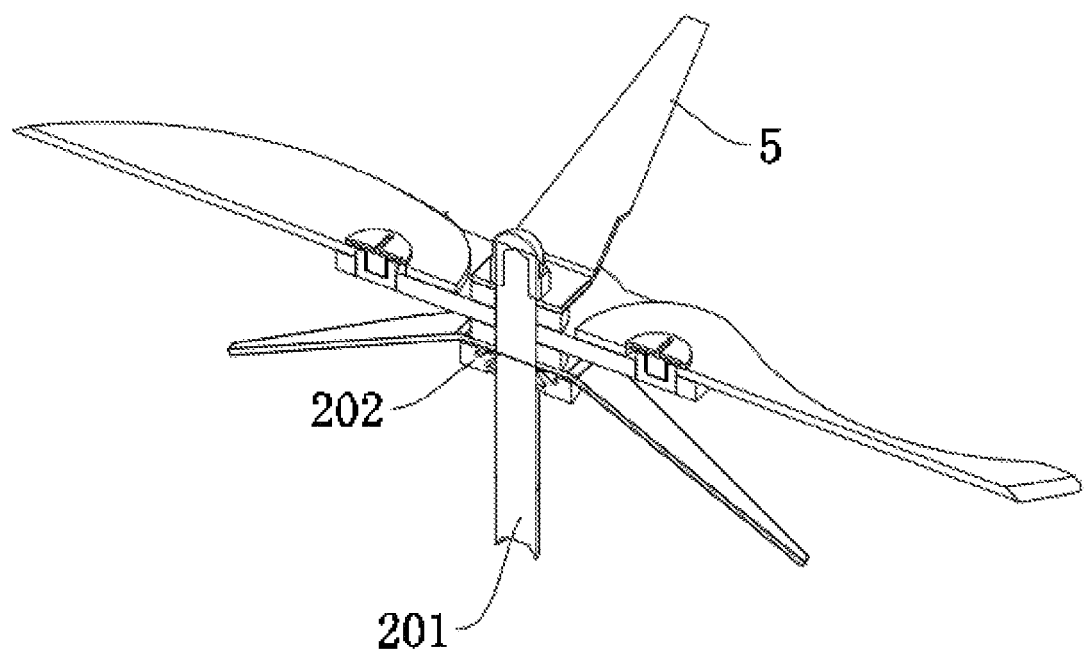
FIG. 4 is a sectional view of FIG. 3 of the present disclosure.
Figure 5:
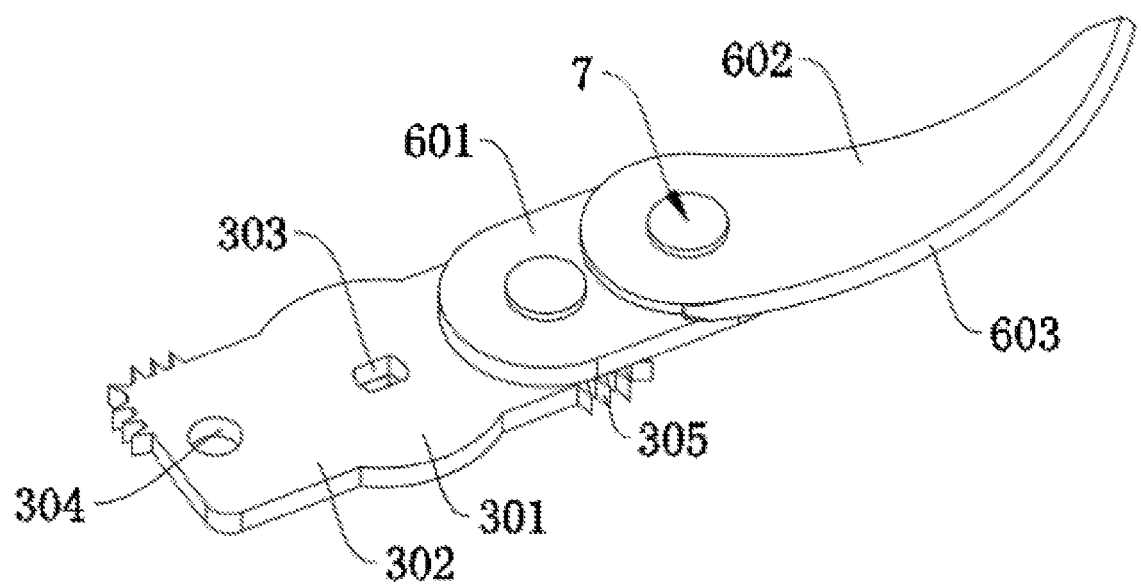
FIG. 5 is a schematic diagram of a structure of a cutter assembly fitted with a bearing component according to the present disclosure.
Figure 6:
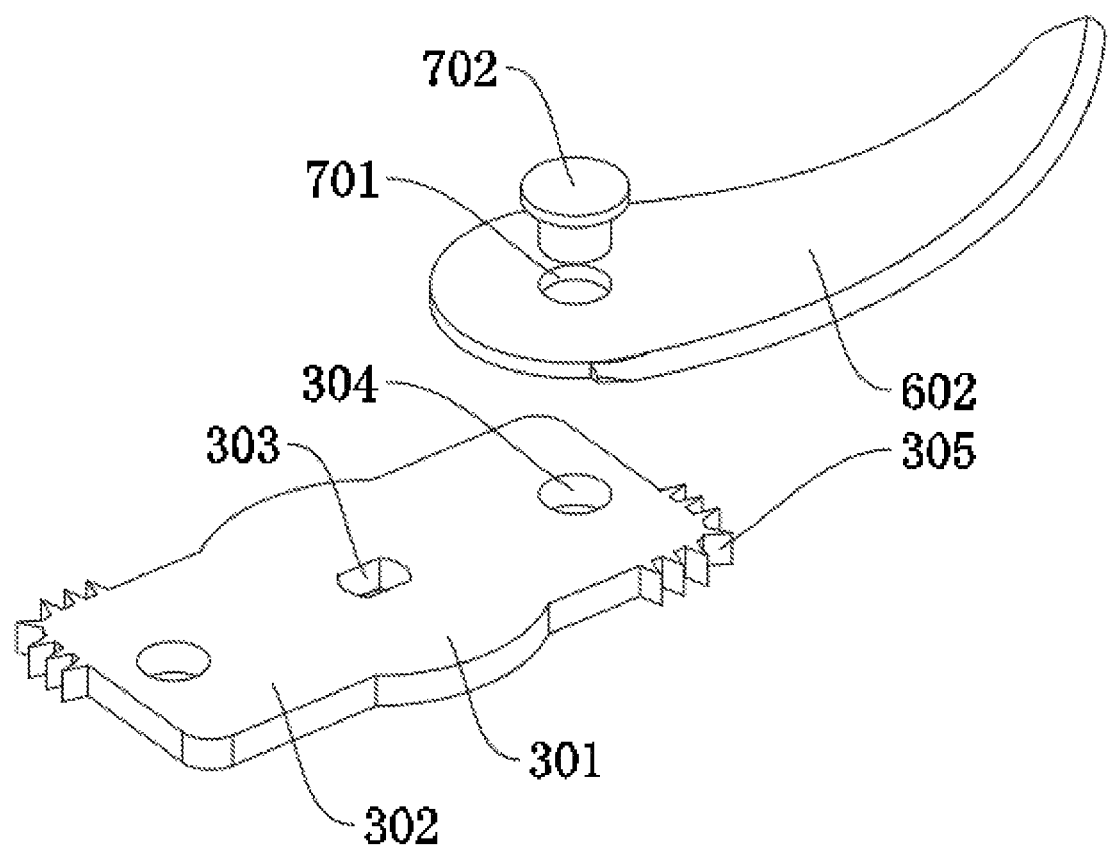
FIG. 6 is a schematic diagram of a structure according to an embodiment 1 of the present disclosure.
Figure 7:
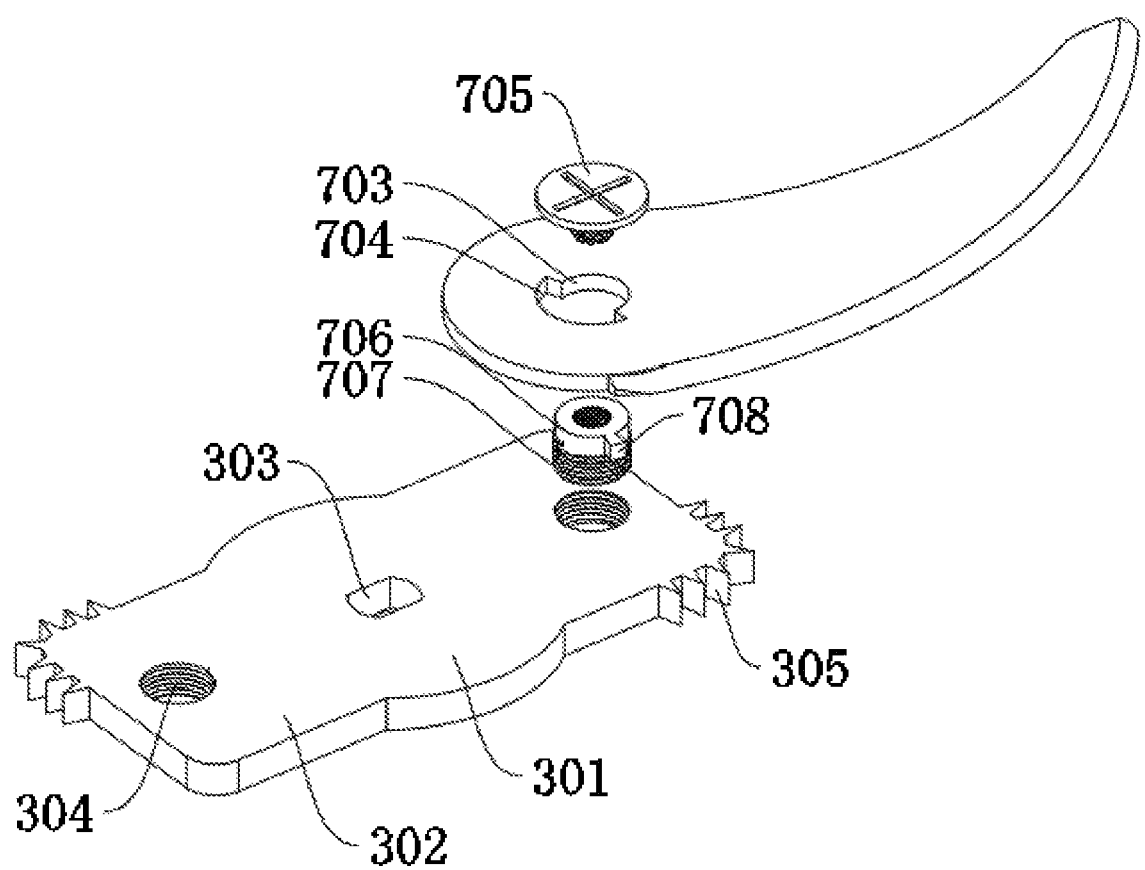
FIG. 7 is a schematic diagram of a structure according to an embodiment 2 of the present disclosure.
Figure 8:
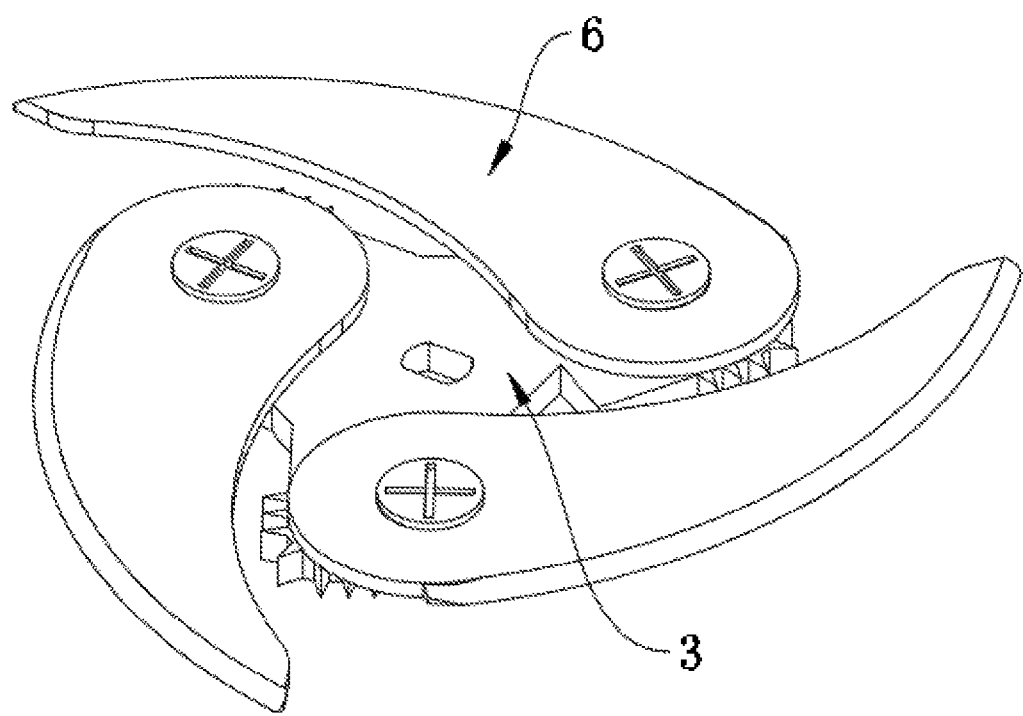
FIG. 8 is a schematic diagram of a structure of three cutter assemblies and a bearing component in a folded state according to the present disclosure.
Figure 9:
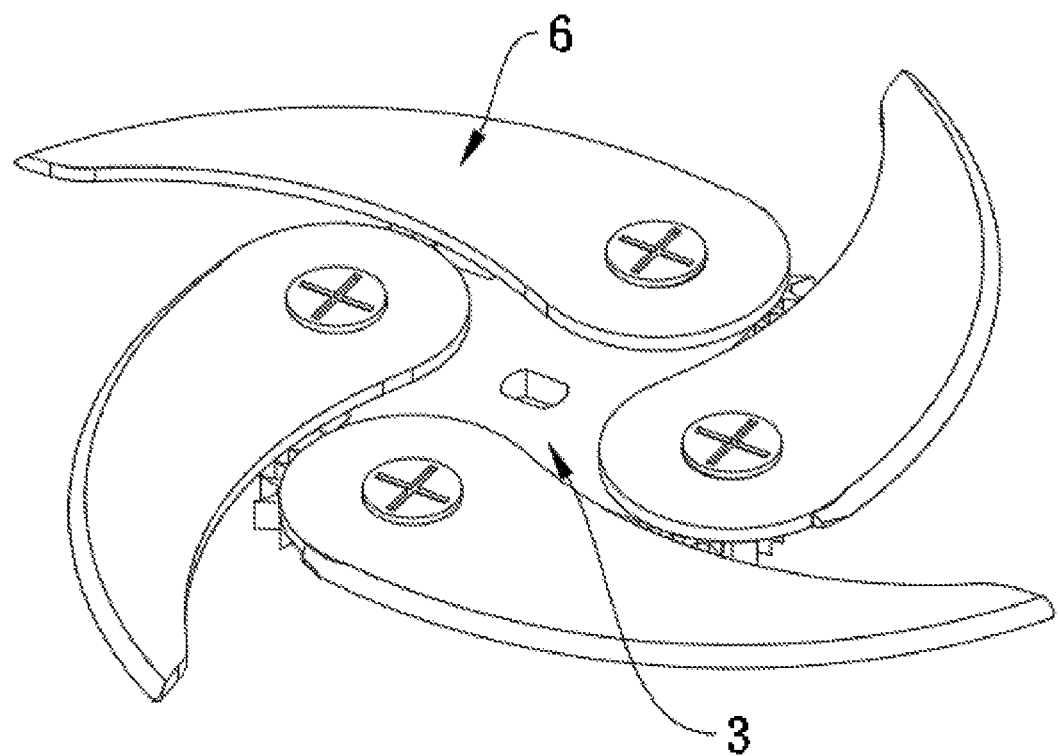
FIG. 9 is a schematic diagram of a structure of four cutter assemblies and a bearing component in a folded state according to the present disclosure.

Reference numerals: 1: base; 2: cutter assembly; 201: shaft; 202: limiting base; 203: locking bolt; 3: bearing component; 301: bearing plate; 302: extension plate; 303: shaft penetrating hole; 304: connection hole; 305: ice crushing teeth; 4: V-shaped short-shaft cutter; 5: blade portion I; 6: force-controlled cutter component; 601: cutter handle; 602: cutter body; 603: blade portion II; 7: movable connection assembly; 701: through hole I; 702: rivet; 703: through hole II; 704: arc-shaped limiting groove; 705: limiting bolt; 706: limiting rod; 707: threaded portion; 708: limiting block.

DETAILED DESCRIPTION OF THE EMBODIMENTS

The present disclosure will be further described below in conjunction with the accompanying drawings and embodiments.

Embodiment 1: Refer to FIG. 1, FIG. 2, FIG. 3, and FIG. 6. A foldable stirring cutter includes a base 1 having a cutter assembly 2 rotationally disposed at a top. The cutter assembly 2 includes a bearing component 3 that is detachably disposed on an outer edge surface and a shaft 201. The bearing component 3 includes a bearing plate 301, and at least two extension plates 302 that are fastened to an outer edge surface of the bearing plate 301 in a ring-shaped equidistant array. Two sets of force-controlled cutter components 6 that are movably connected to the extension plates 302 are disposed on the bearing component 3. Connection holes 304 are provided inside the extension plates 302, and movable connection assemblies 7 that are used to movably connect the force-controlled cutter components 6 to the extension plates 302 are disposed inside the connection holes 304. The force-controlled cutter components 6 deflect and unfold around axes of the movable connection assemblies 7 under action of a centrifugal force, or the force-controlled cutter components 6 deflect and fold around the axes of the movable connection assemblies 7 under action of a lever force borne after collision with a stirred material. The force-controlled cutter component 6 includes a cutter handle 601 and a cutter body 602 that are integrated together, a blade portion II 603 formed on the outer edge surface of the cutter body 602, and the cutter handle 601 is movably connected to the extension plate 302 through the movable connection assembly 7. The movable connection assembly 7 includes a through hole I 701 provided in the cutter handle 601, and a rivet 702 that is used to rotationally limit and fasten the force-controlled cutter component 6 and the bearing component 3 is disposed in the through hole I 701.

Embodiment 2: Refer to FIG. 1, FIG. 2, FIG. 3, and FIG. 7. A foldable stirring cutter includes a base 1 having a cutter assembly 2 rotationally disposed at a top. The cutter assembly 2 includes a bearing component 3 that is detachably disposed on an outer edge surface and a shaft 201. The bearing component 3 includes a bearing plate 301, and at least two extension plates 302 that are fastened to an outer edge surface of the bearing plate 301 in a ring-shaped equidistant array. Two sets of force-controlled cutter components 6 that are movably connected to the extension plates 302 are disposed on the bearing component 3. Connection holes 304 are provided inside the extension plates 302, and movable connection assemblies 7 that are used to movably connect the force-controlled cutter components 6 to the extension plates 302 are disposed inside the connection holes 304. The force-controlled cutter components 6 deflect and unfold around axes of the movable connection assemblies 7 under action of a centrifugal force, or the force-controlled cutter components 6 deflect and fold around the axes of the movable connection assemblies 7 under action of a lever force borne after collision with a stirred material. The force-controlled cutter component 6 includes a cutter handle 601 and a cutter body 602 that are integrated together, a blade portion II 603 formed on the outer edge surface of the cutter body 602, and the cutter handle 601 is movably connected to the extension plate 302 through the movable connection assembly 7. The connection hole 304 is an internally threaded through hole provided on the extension plate 302, the movable connection assembly 7 includes a through hole II 703 provided in the cutter handle 601, and an arc-shaped limiting groove 704 that extends inside towards the cutter handle 601 is provided in an inner wall of the through hole II 703. The movable connection assembly 7 further includes a limiting rod 706 that has a threaded portion 707 and that is located on an outer edge surface at a bottom. A limiting block 708 is disposed at a top of the outer edge surface of the limiting rod 706, a threaded hole is centrally provided at a top of the limiting rod 706. A bottom of the limiting rod 706 is connected inside the connection hole 304 in a threaded manner, and the top of the limiting rod 706 extends inside the through hole II 703. The limiting block 708 is adaptively mounted in the arc-shaped limiting groove 704, and a limiting bolt 705 of which one end is screwed in the threaded hole is disposed in the through hole II 703.

Embodiment 3: Refer to FIG. 1, FIG. 2, FIG. 3, FIG. 5, and FIG. 6. A foldable stirring cutter includes a base 1 having a cutter assembly 2 rotationally disposed at a top. The cutter assembly 2 includes a bearing component 3 that is detachably disposed on an outer edge surface and a shaft 201. The bearing component 3 includes a bearing plate 301, and at least two extension plates 302 that are fastened to an outer edge surface of the bearing plate 301 in a ring-shaped equidistant array. Two sets of force-controlled cutter components 6 that are movably connected to the extension plates 302 are disposed on the bearing component 3. Connection holes 304 are provided inside the extension plates 302, and movable connection assemblies 7 that are used to movably connect the force-controlled cutter components 6 to the extension plates 302 are disposed inside the connection holes 304. The force-controlled cutter components 6 deflect and unfold around axes of the movable connection assemblies 7 under action of a centrifugal force, or the force-controlled cutter components 6 deflect and fold around the axes of the movable connection assemblies 7 under action of a lever force borne after collision with a stirred material. The force-controlled cutter component 6 includes a cutter handle 601 and a cutter body 602 that are separately disposed and movably connected, the cutter handle 601 is movably connected to the extension plate 302 through the movable connection assembly 7, the cutter body 602 is movably connected to the cutter handle 601 through the movable connection assembly 7, and a blade portion II 603 is formed at an outer edge surface of the cutter body 602. The movable connection assembly 7 includes a through hole I 701 provided in the cutter handle 601, and a rivet 702 that is used to rotationally limit and fasten the force-controlled cutter component 6 and the bearing component 3 is disposed in the through hole I 701.

Embodiment 4: Refer to FIG. 1, FIG. 2, FIG. 3, FIG. 5, and FIG. 7. A foldable stirring cutter includes a base 1 having a cutter assembly 2 rotationally disposed at a top. The cutter assembly 2 includes a bearing component 3 that is detachably disposed on an outer edge surface and a shaft 201. The bearing component 3 includes a bearing plate 301, and at least two extension plates 302 that are fastened to an outer edge surface of the bearing plate 301 in a ring-shaped equidistant array. Two sets of force-controlled cutter components 6 that are movably connected to the extension plates 302 are disposed on the bearing component 3. Connection holes 304 are provided inside the extension plates 302, and movable connection assemblies 7 that are used to movably connect the force-controlled cutter components 6 to the extension plates 302 are disposed inside the connection holes 304. The force-controlled cutter components 6 deflect and unfold around axes of the movable connection assemblies 7 under action of a centrifugal force, or the force-controlled cutter components 6 deflect and fold around the axes of the movable connection assemblies 7 under action of a lever force borne after collision with a stirred material. The force-controlled cutter component 6 includes a cutter handle 601 and a cutter body 602 that are separately disposed and movably connected, the cutter handle 601 is movably connected to the extension plate 302 through the movable connection assembly 7, the cutter body 602 is movably connected to the cutter handle 601 through the movable connection assembly 7, and a blade portion II 603 is formed at an outer edge surface of the cutter body 602. The connection hole 304 is an internally threaded through hole provided on the extension plate 302, the movable connection assembly 7 includes a through hole II 703 provided in the cutter handle 601, and an arc-shaped limiting groove 704 that extends inside towards the cutter handle 601 is provided in an inner wall of the through hole II 703. The movable connection assembly 7 further includes a limiting rod 706 that has a threaded portion 707 and that is located on an outer edge surface at a bottom. A limiting block 708 is disposed at a top of the outer edge surface of the limiting rod 706, a threaded hole is centrally provided at a top of the limiting rod 706. A bottom of the limiting rod 706 is connected inside the connection hole 304 in a threaded manner, and the top of the limiting rod 706 extends inside the through hole II 703. The limiting block 708 is adaptively mounted in the arc-shaped limiting groove 704, and a limiting bolt 705 of which one end is screwed in the threaded hole is disposed in the through hole II 703.

Refer to FIG. 2, FIG. 4, FIG. 5, and FIG. 6. Specifically, to crush ice during a mixing process, ice crushing teeth 305 are disposed at a corner of the extension plate 302, the ice crushing teeth 305 are linearly distributed and disposed at an angular position of the extension plate 302, and a shaft penetrating hole 303 through which the shaft 201 passes is centrally provided inside the bearing plate 301.

After the fixed blade is connected to a foldable cutter blade through the movable connection assembly 7, the foldable blade can be rotated horizontally to the right or left around the connection assembly 7 under an external force (for example, a centrifugal force/centripetal force).

When the fixed stirring cutter is mounted on a (for example, 380/390/540) shaft of a motor rotating at a high speed (for example, 10,000 to 20,000 revolutions per minute), the fixed stirring cutter rotates with the motor at a high speed. Therefore, a centrifugal/centripetal force is generated at an end of the fixed stirring cutter around the shaft of the motor. In this case, the foldable blade can be unfolded through the centrifugal/centripetal force.

When the foldable blade meets a large piece of food during rotation, resistance of the foldable blade is greater than the centrifugal force of the foldable blade, the foldable knife blade is instantly folded to avoid the large piece of food, and does not collide with the large piece of food. Therefore, the foldable knife is not jammed by the large piece of food.

When the motor does not rotate, the foldable blade is in a free state (either an unfolded state/a folded state or a half-folded state).

Refer to FIG. 2 to FIG. 6. To facilitate assembly and disassembly of a cutter assembly 2, V-shaped short-shaft cutters 4 are disposed on an upper surface and a lower surface of the bearing plate 301, the V-shaped short-shaft cutters 4 are distributed in a cross, and a blade portion I 5 is disposed on a lateral side of the V-shaped short-shaft cutters 4. A limiting base 202 is disposed on the outer edge surface of the shaft 201, and the V-shaped short-shaft cutters 4 are overlapped on the limiting base 202. A top of the shaft 201 extends outside the V-shaped short-shaft cutter 4 and the bearing component 3 and has a threaded post, and a locking bolt 203 that is connected to the threaded post in a threaded manner and used to press and fasten the V-shaped short-shaft cutter 4 and the bearing component 3 to the limiting base 202 is disposed outside the top of the shaft 201. According to the present disclosure, the bearing component 3, the force-controlled cutter component 6 and the movable connection assembly 7 are disposed, to resolve technical problems that a fixed blade structure of a current stirring cutter is easy to be damaged in use by a lever force generated after collision with a stirred material, and is easy to be jammed by a large heterogeneous stirred material.

Figure 10:
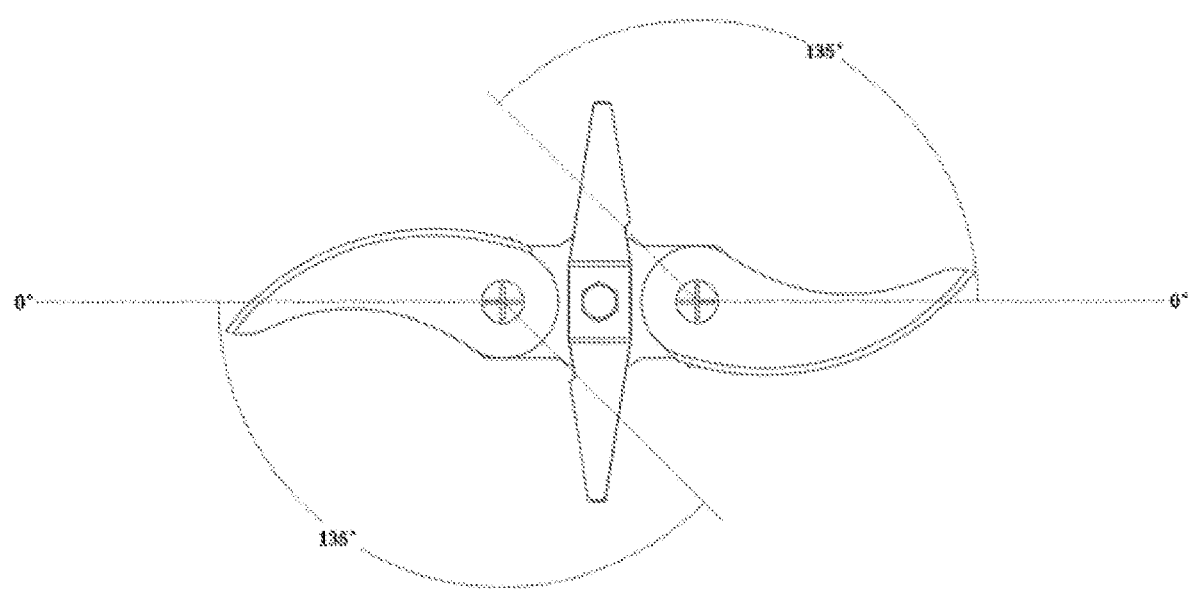
FIG. 10 is a schematic diagram of a structure of an effective cutting angle of a force-controlled cutter component according to the present disclosure.

As shown in FIG. 10, the force-controlled cutter component has an effective cutting angle about 0° to 135°.

Working principle: During use, the cutter assembly 2 is driven by a motor inside the base 1 to rotate. A centrifugal force is generated while cutter assembly 2 rotates, and the force-controlled cutter component 6 is thrown out under action of the centrifugal force, to increase a stirring area after the force-controlled cutter component 6 is unfolded. The stirred material is fully stirred in cooperation with the V-shaped short-shaft cutter 4. When the stirred material is relatively large, the force-controlled cutter component 6 is collided during rotation. If the lever force generated after collision is greater than the centrifugal force generated after rotation of the cutter assembly 2, the stirred material pushes the force-controlled cutter component 6 to be contracted and folded along the axis of the movable connection assembly 7. If the lever force generated after collision is less than the centrifugal force generated after rotation of the cutter assembly 2, the force-controlled cutter component 6 continues to stir in an unfold state under action of the centrifugal force. If there is a large heterogeneous stirred material, the force-controlled cutter component 6 is in contact with the large heterogeneous stirred material, limited to be rotated, contracted and folded while the large heterogeneous stirred material is pushed, to prevent the force-controlled cutter component 6 from being jammed due to hard contact with the force-controlled cutter component 6. The ice crushing teeth 305 are disposed at the corner of the extension plate 302, so that ice can be crushed.

Embodiments in the present disclosure are merely preferred embodiments, and are not limited thereto. Those of ordinary skill in the art can appreciate the spirit of the present disclosure according to embodiments. Extensions and changes made by those of ordinary skill in the art without departing from the spirit of the present disclosure shall be considered as falling within the protection scope of the present disclosure.

The invention claimed is:

1. A foldable stirring cutter, comprising:
a base (1);
a cutter assembly (2) rotationally disposed on a top of the base (1), the cutter assembly (2) including;
a shaft (201);
a bearing component (3) detachably disposed on an outer surface of the shaft (201) of the cutter assembly, the bearing component (3) including a central bearing plate (301) and a plurality of equally spaced extension plates (302) formed on an outer surface of the bearing plate (301), each of the extension plates (302) having an internally threaded connection hole (304),
a plurality of force-controlled cutter components (6) each including a cutter handle (601), a cutter body (602) formed with the cutter handle (601), and a blade portion (603) formed on an outer surface of the cutter body (602), and
a plurality of movable connection assemblies (7) each including a through hole (703) through one of the cutter handles (601), an arc-shaped limiting groove (704) in an inner wall of the through hole (703), an internally threaded limiting rod (706) having an opening with an internally threaded inner surface on a top of said limiting rod and a threaded outer portion disposed on a lower portion of an outer surface of said limiting rod threadedly fastened to one of the internally threaded connection hole (304), a limiting block (708) disposed on an upper portion of the outer surface of the limiting rod (706) and positioned within the arc-shaped groove (704), and a limiting bolt (705) threadedly connected to the opening on top of the internally threaded limiting rod (706) and positioned within the through hole (703) to secure one of said cutter components to one of said extension plates;
wherein each of said plurality of movable connection assemblies is configured to connect one of said force-controlled cutter components to one of said extension plates such that said cutter component is movable between a folded position and an unfolded position.

* * * * *